US010119857B2

(12) United States Patent
Li et al.

(10) Patent No.: US 10,119,857 B2
(45) Date of Patent: Nov. 6, 2018

(54) REFLECTION-ENHANCED PHOTO-DETECTOR

(75) Inventors: Guoliang Li, San Diego, CA (US);
Xuezhe Zheng, San Diego, CA (US);
Ying L. Luo, San Diego, CA (US);
Ashok V. Krishnamoorthy, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 378 days.

(21) Appl. No.: 13/588,248

(22) Filed: Aug. 17, 2012

(65) Prior Publication Data

US 2014/0246571 A1  Sep. 4, 2014

(51) Int. Cl.
| | |
|---|---|
| *G01J 1/04* | (2006.01) |
| *G01J 1/42* | (2006.01) |
| *G01J 1/02* | (2006.01) |
| *G02B 6/12* | (2006.01) |
| *G02B 6/124* | (2006.01) |

(52) U.S. Cl.
CPC ............ *G01J 1/0407* (2013.01); *G01J 1/0209* (2013.01); *G01J 1/0425* (2013.01); *G01J 1/42* (2013.01); *G02B 6/124* (2013.01); *G02B 6/12004* (2013.01)

(58) Field of Classification Search
CPC .... G01J 1/42; G01J 1/0407; G01J 1/04; G01J 1/0411
USPC ........... 250/208.1, 216, 221, 227.11, 227.14, 250/227.28; 385/4, 10, 12, 14, 37, 39, 385/40; 257/7, 8, 9, 99, 116, 431–433, 257/436
See application file for complete search history.

(56) References Cited

U.S. PATENT DOCUMENTS

| | | | |
|---|---|---|---|
| 5,391,869 A * | 2/1995 | Ade et al. | 250/227.24 |
| 6,539,136 B1 * | 3/2003 | Dianov et al. | 385/12 |
| 7,043,997 B2 * | 5/2006 | Mattson et al. | 73/800 |

(Continued)

OTHER PUBLICATIONS

Shirong Liao et al., "36 GHz Submicron Silicon Waveguide Germanium Photodetector", May 23, 2011, vol. 19, No. 11, Optics Express.

(Continued)

*Primary Examiner* — Georgia Y Epps
*Assistant Examiner* — Don Williams
(74) *Attorney, Agent, or Firm* — Park, Vaughan, Fleming & Dowler LLP (57) ABSTRACT

An integrated optical device includes a photo-detector (such as germanium) optically coupled to an optical waveguide. This photo-detector is deposited on the optical waveguide, and an optical signal propagating in the optical waveguide may be evanescently coupled to the photo-detector. In order to increase the absorption length of the photo-detector, a mirror (such as a distributed Bragg reflection grating) is included in the optical waveguide near the end of the photo-detector. This mirror reflects the optical signal back toward the photo-detector, thereby increasing the absorption of the optical signal by the photo-detector. In addition, absorption may be reduced by using electrical contacts that are electrically coupled to the photo-detector at locations where the optical mode of the optical signal is largely in the underlying optical waveguide, and by using a fingered metal layer to couple to the electrical contacts.

18 Claims, 6 Drawing Sheets

(56) References Cited

U.S. PATENT DOCUMENTS

| | | | |
|---|---|---|---|
| 8,269,303 B2* | 9/2012 | Fujikata et al. | 257/458 |
| 2004/0185386 A1* | 9/2004 | Block | G02B 6/12004 |
| | | | 430/321 |
| 2005/0259270 A1* | 11/2005 | Pocha | G01D 5/35303 |
| | | | 356/519 |
| 2007/0252995 A1* | 11/2007 | Shaw | G01N 21/552 |
| | | | 356/437 |
| 2009/0060412 A1* | 3/2009 | Chen et al. | 385/10 |
| 2009/0169150 A1* | 7/2009 | Xia | 385/12 |
| 2015/0168647 A1* | 6/2015 | Liang | B82Y 20/00 |
| | | | 385/14 |

OTHER PUBLICATIONS

Gianlorenzo Masini et al., "High-Speed Near Infrared Optical Receivers Based on Ge Waveguide Photodetectors Integrated in a CMOS Process", Hindawi Publishing Corporation, Advances in Optical Technologies, vol. 2008, Article ID 196572.

Long Chen et al., "High Performance Germanium Photodetectors Integrated on Submicron Silicon Waveguides by Low Temperature Wafer Bonding", Jul. 21, 2008, vol. 16, No. 15, Optics Express.

Gianlorenzo Masini et al., "A Four-Channel, 10Gbps Monolithic Optical Receiver in 130nm CMOS with Integrated Ge Waveguide Photodetectors", 2007 OSA, NFOEC.

Laurent Vivien et al., "High Speed and High Responsivity Germanium Photodetector Integrated in a Silicon-On-Insulator Microwaveguide", Jul. 23, 2007, vol. 15, No. 15 Optics Express.

L. Ding et al., "Ge Waveguide Photodetectors with Responsivity Roll-off Beyond 1620 nm Using Localized Stressor", OFC, NFOEC Technical Digest, 2012.

* cited by examiner

REFLECTION-ENHANCED PHOTO-DETECTOR

GOVERNMENT LICENSE RIGHTS

This invention was made with United States government support under Agreement No. HR0011-08-9-0001 awarded by DARPA. The United States government has certain rights in the invention.

BACKGROUND

Field

The present disclosure relates to techniques for detecting optical signals. More specifically, the present disclosure relates to an integrated photo-detector that includes a mirror that enhances absorption of an optical signal.

Related Art

Silicon photonics is a promising technology that can provide large communication bandwidth, low latency and low power consumption for inter-chip and intra-chip interconnect or link. A key component for use in inter-chip and intra-chip silicon-photonic interconnect is a photo-detector. For high-speed applications, the photo-detector needs to have high responsivity and high bandwidth. In general, an optical waveguide photo-detector geometry is preferred over a surface-illuminated photo-detector, because it can have a longer absorption length without the carrier-transit-time limiting the bandwidth. Optical waveguide photo-detectors have been demonstrated with responsivity up to 1 A/W (at a wavelength of 1550 nm) and a speed beyond 25 Gb/s.

However, chip-to-chip interconnects typically place more restrictions and requirements on photo-detectors. In particular, a CMOS-compatible process may not allow high-temperature growth of the photo-detector material. If a lower growth temperature is used, the absorption coefficient in the C-band (wavelengths between 1530 nm and 1565 nm) may be reduced because of the lack of tensile strain. As a consequence, a photo-detector may take longer absorption length to achieve high responsivity, which can result in a higher capacitance and a lower bandwidth. Furthermore, chip-to-chip interconnects usually require very low-power-consumption optical receivers, which requires the photo-detector capacitance be as small as possible (instead of just high bandwidth). For example, a 30 GHz photo-detector bandwidth can be achieved with 100 fF capacitance, but a low-power-consumption specification may require a photo-detector capacitance below 20 fF.

The relationship between the optical receiver power and the photo-detector capacitance can be understood as follows. The optical receiver in a silicon-photonic interconnect usually includes a photo-detector followed by a transimpedance amplifier. Furthermore, the transimpedance-amplifier signal-to-noise ratio may be maximized when its input capacitance ($C_i$) is roughly equal to the photo-detector capacitance ($C_d$). Because the transimpedance-amplifier power consumption is proportional to its size, and hence to its capacitance $C_i$, a smaller photo-detector capacitance results in reduced power consumption by the transimpedance amplifier, which is often a significant portion of the power consumed by the entire interconnect. In general, small photo-detector capacitance is desirable in high-speed interconnects, because the maximum signal-to-noise ratio is proportional to $(BW^2 \cdot C_d)^{-1}$, where BW is the bandwidth of the optical receiver.

However, high responsivity and low capacitance are usually conflicting requirements for photo-detectors, because the former requires longer optical waveguides to increase the absorption, whereas the latter requires the opposite. As a consequence, there is usually a difficult tradeoff when designing photo-detector absorption length.

Hence, what is needed is a photo-detector without the above-described problems.

SUMMARY

One embodiment of the present disclosure provides an optical device. This optical device includes an optical waveguide that conveys an optical signal having a wavelength. Moreover, the optical device includes a photo-detector having a first end and second end, where the photo-detector is disposed on top of and is optically coupled to a surface of a region of the optical waveguide. This photo-detector converts the optical signal to an electrical signal. Furthermore, the optical device includes a mirror after and proximate to the second end of the photo-detector, where the mirror is in a plane of the optical waveguide. This mirror at least partially reflects the optical signal.

Note that the optical signal may be evanescently coupled between the optical waveguide and the photo-detector. Moreover, the photo-detector may include germanium, and the optical waveguide may include silicon.

In some embodiments, the mirror is included in the optical waveguide after and proximate to the second end of the photo-detector. Furthermore, the mirror may include a distributed Bragg reflection grating.

Additionally, the photo-detector may include periodic rows of electrical contacts on top of and along a length of the photo-detector. Furthermore, the electrical contacts may be positioned at locations along the length where the optical signal is substantially in the bottom optical waveguide.

In some embodiments, the optical waveguide includes a taper that expands a width of the optical waveguide prior to the photo-detector.

Moreover, the optical device may include: a substrate; a buried-oxide layer disposed on the substrate; and a semiconductor layer disposed on the buried-oxide layer, where the optical waveguide is included in the semiconductor layer. For example, the substrate may include a semiconductor.

Another embodiment provides a system that includes the optical device.

Another embodiment provides a method for converting the optical signal into an electrical signal, which may be performed by the optical device. During operation, the optical signal is conveyed in the optical waveguide in the first propagation direction. This optical signal is evanescently coupled into the photo-detector disposed on the surface of the optical waveguide. Then, a portion of the optical signal is converted into the electrical signal in the photo-detector. Moreover, a remainder of the optical signal is reflected in the second propagation direction using the mirror proximate to an end of the photo-detector and in the plane of the optical waveguide. Next, the remainder of the optical signal is evanescently coupled into the photo-detector, and a portion of the remainder of the optical signal is converted into the electrical signal in the photo-detector.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical device, a system that includes the optical device, and a method for converting an optical signal into an electrical signal are described. This integrated optical device includes a photo-detector (such as germanium) optically coupled to an optical waveguide (such as silicon). In particular, the photo-detector is deposited on the optical waveguide, and an optical signal propagating in the optical waveguide may be evanescently coupled to the photo-detector. In order to increase the absorption length of the photo-detector, a mirror (such as a distributed Bragg reflection grating) is included in the optical waveguide near the end of the photo-detector. This mirror reflects the optical signal back toward the photo-detector, thereby increasing the absorption of the optical signal by the photo-detector.

By reflecting the optical signal back to the photo-detector, the mirror increases the absorption length by a factor of two. Therefore, this detection technique improves the performance of the photo-detector without: increasing the capacitance, decreasing the bandwidth and/or increasing the power consumption.

Figure 1:
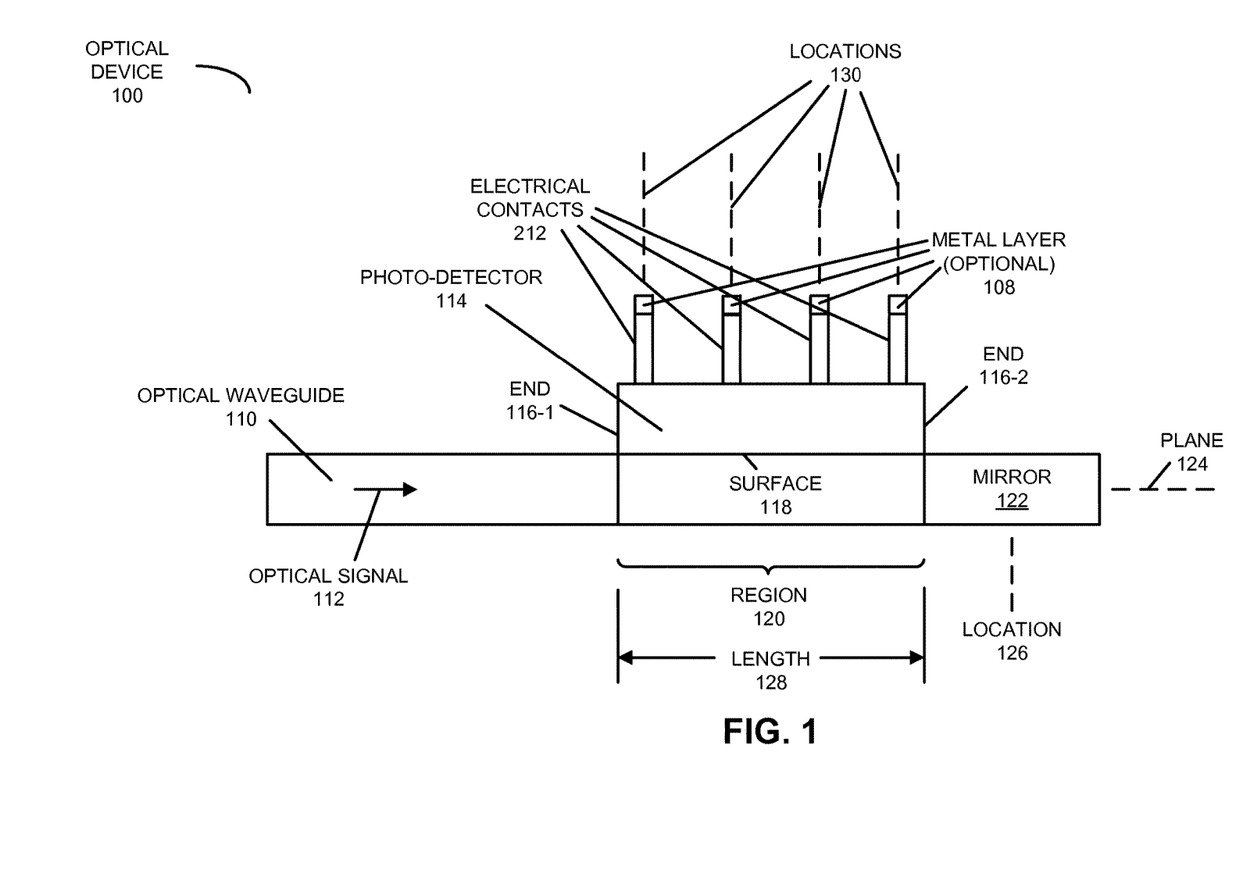
FIG. 1 is a block diagram illustrating a side view of an optical device in accordance with an embodiment of the present disclosure.

We now describe embodiments of the optical device. FIG. 1 presents a block diagram illustrating a side view of an optical device 100. This optical device includes an optical waveguide 110 that conveys an optical signal 112 having a wavelength. Moreover, optical device 100 includes a photo-detector 114 (such as germanium) having a near end 116-1 and a far end 116-2, where photo-detector 114 is disposed on and optically coupled to a surface 118 of a region 120 of optical waveguide 110. This photo-detector converts optical signal 112 to an electrical signal (such as a photo-current), for example, through absorption at the wavelength. Note that optical signal 112 may be evanescently coupled between optical waveguide 110 and photo-detector 114.

Furthermore, optical device 100 includes a mirror 122 after and proximate to end 116-2 of photo-detector 114, where mirror 122 is in a plane 124 of optical waveguide 110. In some embodiments, mirror 122 is included in optical waveguide 110. Furthermore, mirror 122 may include: a distributed Bragg reflection grating or metal on a surface of optical waveguide 110, or an etched vertical facet with a high-reflection coating on optical waveguide 110.

Mirror 122 at least partially reflects optical signal 112. Therefore, after passing through photo-detector 114, when the remaining (un-absorbed) optical power propagates to mirror 122, it is reflected back to photo-detector 114, thereby allowing a second absorption pass. This effectively doubles the absorption length of photo-detector 114 without adding any capacitance; hence the performance of photo-detector 114 can be improved without penalty (i.e., without increasing the capacitance of photo-detector 114). In an exemplary embodiment, mirror 122 may increase the responsivity of photo-detector 114 by up to 25% without increasing the capacitance of photo-detector 114. Therefore, the signal-to-noise ratio of photo-detector 114 may be increased by up to 2 dB.

Figure 2:
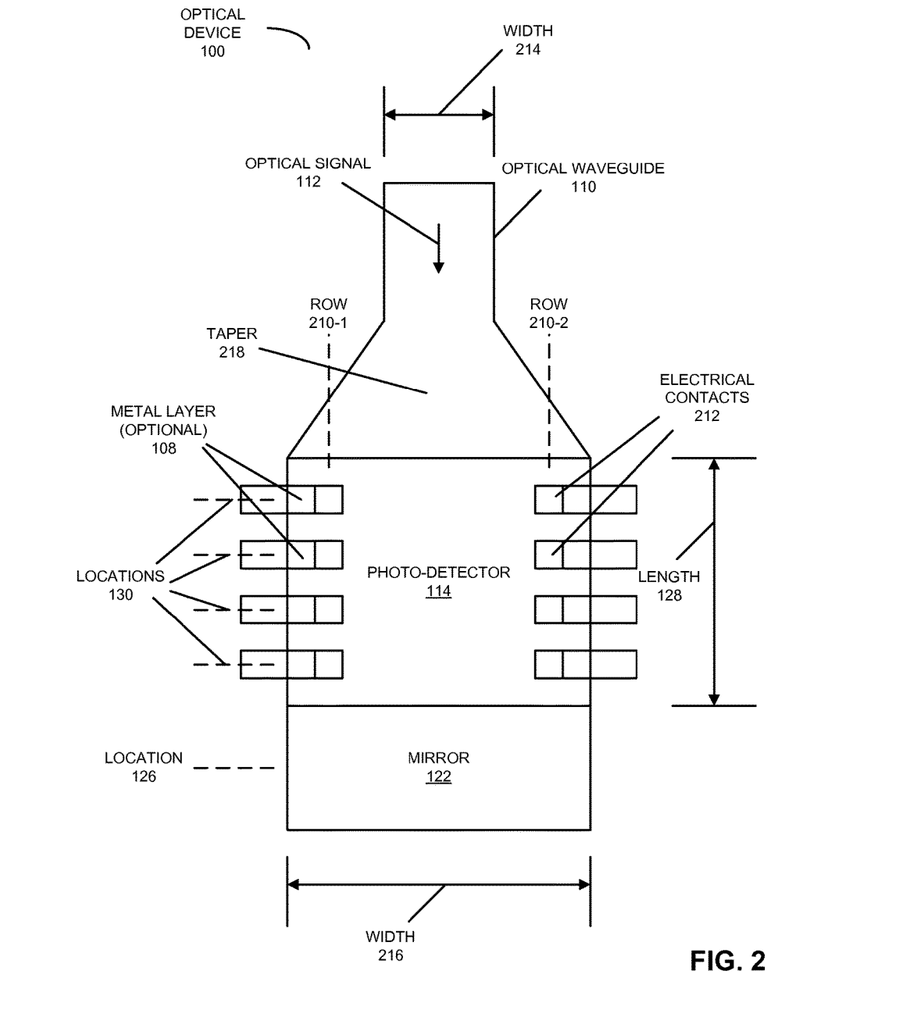
FIG. 2 is a block diagram illustrating a top view of the optical device of FIG. 1 in accordance with an embodiment of the present disclosure.

FIG. 2 presents a block diagram illustrating a top view of optical device 100 (FIG. 1). As shown in FIG. 2, photo-detector 114 may include periodic rows 210 of electrical contacts 212 along a length 128 of photo-detector 114. These electrical contacts may be positioned at locations 130 along length 128 where optical signal 112 is substantially in bottom optical waveguide 110 (because the evanescent coupling excites an optical mode whose strength or amplitude varies at different positions along length 128). In this way, optical signal 112 may be absorbed in photo-detector 114 away from metal electrical contacts 212, thereby reducing metal absorption loss. In addition, electrical contacts 212 in a given row (such as row 210-1) may be electrically connected to each other in an optional metal layer 108 (such as an M1 metal layer) in FIG. 2 above electrical contacts 212. Note that optional metal layer 108 may be fingered. The use of such a fingered metal layer may reduce the overlap between the optical mode and the metal layer, thereby reducing metal absorption loss.

In some embodiments, optical waveguide 110 includes a taper 218 that expands optical waveguide 110 prior to photo-detector 114 from width 214 to width 216.

In an exemplary embodiment, width 214 is 0.5 µm, width 216 is 1.4 µm, length 128 is 10-20 µm, and locations 130 may be separated from each other by 1.5 to 2 µm. The responsivity of photo-detector 114 may be greater than 0.8 W/m at a wavelength of 1550 nm and the capacitance may be less than 10-20 fF. Furthermore, with photo-detector 114 reverse biased at 1 V, the dark current may be 3 µA. Additionally, a distributed Bragg reflection grating or reflector immediately after photo-detector 114 (i.e., mirror 122) may be fabricated by etching 220-nm-deep trenches on a 300 nm thick optical waveguide 110, with a period of 310 nm and a duty cycle of 50%. This distributed Bragg reflection grating may have approximately 100% reflection at a wavelength of 1550 nm.

Figure 3:
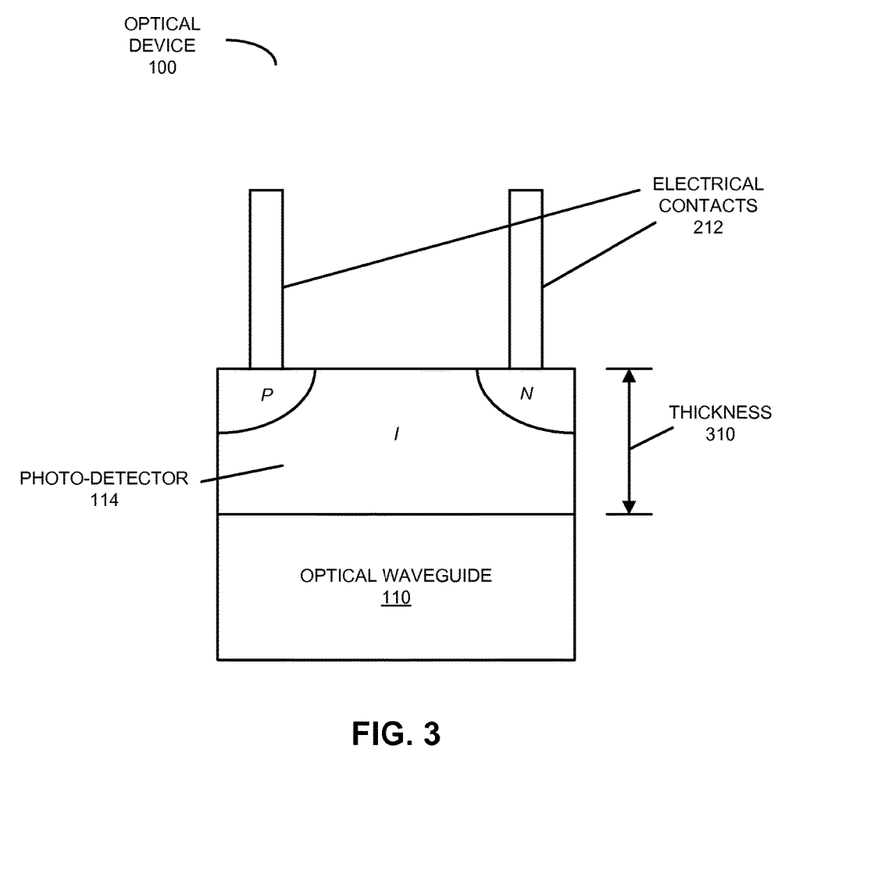
FIG. 3 is a block diagram illustrating an end view of the optical device of FIG. 1 in accordance with an embodiment of the present disclosure.

Optical device 100 can be used with various optical waveguide photo-detector structures. For example, as shown in FIG. 3, which presents a block diagram illustrating an end view of optical device 100 (FIG. 1), the photo-detector structure uses evanescent coupling between optical waveguide 110 and photo-detector 114 (e.g., between silicon and germanium) with a lateral PIN junction to collect the photo-current. Thickness 310 of photo-detector 114 may be 200-300 nm.

However, in other embodiments different optical waveguide-to-photo-detector coupling and/or different junctions can be used in conjunction with an integrated mirror. (For example, the photo-detector structure may use: butt coupling, a vertical PIN structure and/or a lateral metal-semiconductor-metal junction.) In the process, the photo-detector performance can be improved without penalty.

Note that integrating photo-detector 114 in optical waveguide 110 may constrain the growth temperature in order to be a CMOS-compatible process. In particular, a germanium photo-detector grown at high temperature (greater than 700

C) may have high responsivity and high speed. This is because high-temperature growth can cause tensile strain in the germanium film when it is cooled. In turn, the tensile strain may shrink the bandgap in the germanium material, which can extend the absorption edge to a longer wavelength, thereby providing a 4-5 times higher absorption coefficient in the C-band. However, these growth temperatures are typically incompatible with a CMOS process. If a lower growth temperature is used (such as 350 C), the photo-detector may have a much lower absorption. For example, the responsivity at a wavelength of 1550 nm may be 0.6 A/W if mirror 122 (FIGS. 1 and 2) is not used.

In addition, when mirror 122 (FIGS. 1 and 2) is integrated into optical waveguide 110, the back-reflected optical wave may deteriorate the performance of an optical source of optical signal 112 (FIGS. 1 and 2), such as a laser. For example, a typical semiconductor laser may require that the back reflection is less than 0.1% (or less than −30 dB) for stable lasing. With an appropriate length 128 in FIGS. 1 and 2 (such as 15 µm), and with a total optical loss greater than 15 dB in a typical silicon-photonic link (so that the round-trip optical loss is greater than 30 dB), the reflected back laser power will be significantly attenuated (for example, it may correspond to less than −40 dB reflection to the laser). This may reduce or eliminate an adverse impact on the performance of the optical source.

Figure 4:
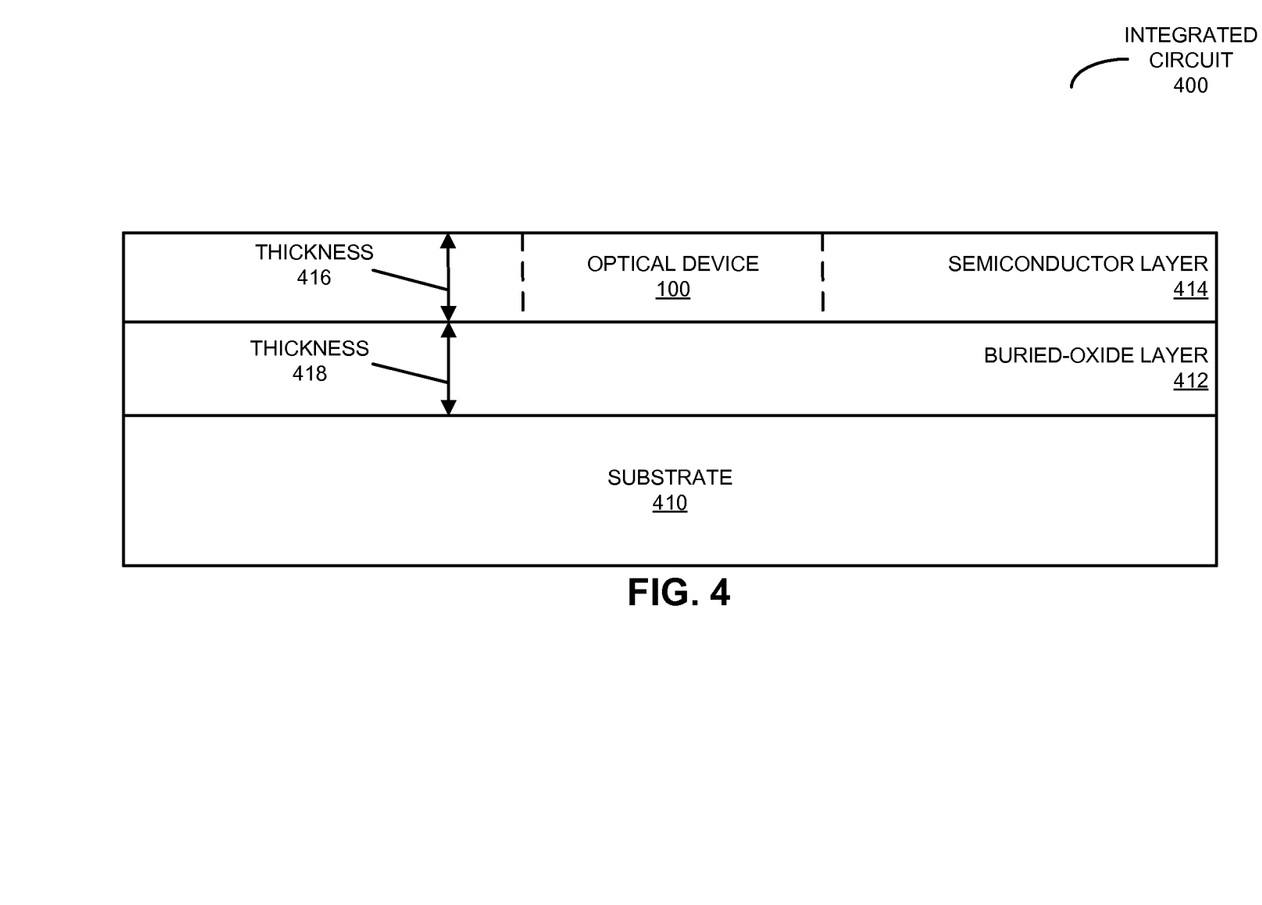
FIG. 4 is a block diagram illustrating a side view of an integrated circuit that includes the optical device of FIGS. 1-3 in accordance with an embodiment of the present disclosure.

The preceding embodiments of the optical device may, at least in part, be implemented using silicon-on-insulator (SOI) technology. This is shown in FIG. 4, which presents a block diagram illustrating a side view of integrated circuit 400 that includes optical device 100 (FIGS. 1-3). In particular, integrated circuit 400 may include: a substrate 410; a buried-oxide layer 412 disposed on substrate 410; and a semiconductor layer 414 disposed on buried-oxide layer 412. As illustrated in FIG. 4, optical device 100 in FIGS. 1-3 may be included in semiconductor layer 414. Note that substrate 410 and/or semiconductor layer 414 may include a semiconductor, such as silicon.

In an exemplary embodiment, optical signal 112 (FIGS. 1 and 2) has one or more wavelengths between 1.1-1.7 µm, such as an optical signal having a fundamental wavelength of 1.3 or 1.55 µm. Moreover, semiconductor layer 414 may have a thickness 416 that is less than 1 µm (such as 0.25-0.3 µm). Furthermore, buried-oxide layer 412 may have a thickness 418 between 0.3 and 3 µm (such as 0.8 µm).

Figure 5:
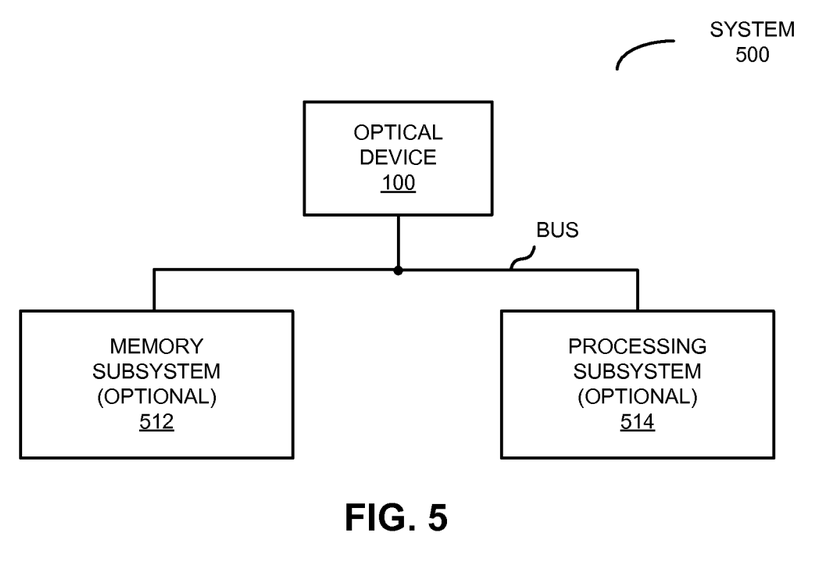
FIG. 5 is a block diagram illustrating a system that includes the optical device of FIGS. 1-3 in accordance with an embodiment of the present disclosure.

The optical device may be used in a variety of applications. This is shown in FIG. 5, which presents a block diagram illustrating a system 500 that includes optical device 100.

In general, functions of optical device 100 and system 500 may be implemented in hardware and/or in software. Thus, system 500 may include one or more program modules or sets of instructions stored in an optional memory subsystem 512 (such as DRAM or another type of volatile or non-volatile computer-readable memory), which may be executed by an optional processing subsystem 514. Note that the one or more computer programs may constitute a computer-program mechanism. Furthermore, instructions in the various modules in optional memory subsystem 512 may be implemented in: a high-level procedural language, an object-oriented programming language, and/or in an assembly or machine language. Note that the programming language may be compiled or interpreted, e.g., configurable or configured, to be executed by the processing subsystem.

Components in system 500 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 500 may be at one location or may be distributed over multiple, geographically dispersed locations.

System 500 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Note that a given computer system may be at one location or may be distributed over multiple, geographically dispersed locations.

Moreover, the optical device can be used in a wide variety of applications, such as: optical communications (for example, in an optical interconnect or an optical link), data storage (such as an optical-storage device or system), medicine (such as a diagnostic technique or surgery), a barcode scanner, and/or metrology (such as precision measurements of distance).

Furthermore, the embodiments of the optical device, the integrated circuit and/or the system may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the optical device, the integrated circuit and/or the system may be implemented more in hardware and less in software, or less in hardware and more in software, as is known in the art.

While a silicon optical waveguide and a germanium photo-detector were illustrated in the preceding embodiments, the detection technique may be used with other materials, as is known to one of skill in the art.

In the preceding description, we refer to 'some embodiments.' Note that 'some embodiments' describes a subset of all of the possible embodiments, but does not always specify the same subset of embodiments.

Figure 6:
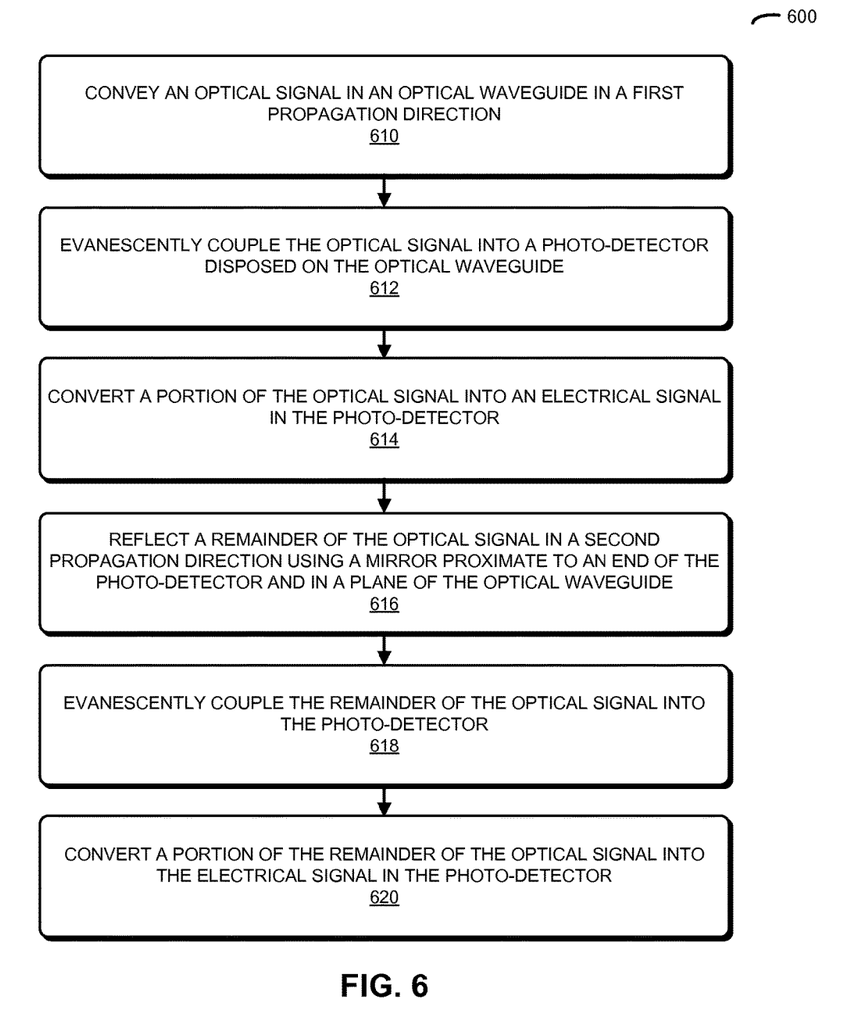
FIG. 6 is a flow chart illustrating a method for converting an optical signal into an electrical signal in accordance with an embodiment of the present disclosure.

We now describe embodiments of the method. FIG. 6 presents a flow chart illustrating a method 600 for converting an optical signal into an electrical signal, which may be performed by optical device 100 (FIGS. 1-3 and 4). During operation, an optical signal is conveyed in an optical waveguide in a first propagation direction (operation 610). This optical signal is evanescently coupled into a photo-detector disposed on a surface of the optical waveguide (operation 612). Then, a portion of the optical signal is converted into an electrical signal in the photo-detector (operation 614). Moreover, a remainder of the optical signal is reflected in a second propagation direction using a mirror proximate to an end of the photo-detector and in a plane of the optical waveguide (operation 616). Next, the remainder of the optical signal is evanescently coupled into the photo-detector (operation 618), and a portion of the remainder of the optical signal is converted into the electrical signal in the photo-detector (operation 620).

In some embodiments of method 600, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical device, comprising:
an optical waveguide configured to convey an optical signal having a wavelength;
a photo-detector having a first end and a second end on opposite sides of side surfaces of the photo-detector, wherein a bottom surface of the photo-detector is disposed on and optically coupled to a region of a top surface of the optical waveguide, wherein the photo-detector is configured to convert the optical signal to an electrical signal; and
a mirror after and proximate to the second end of the photo-detector, wherein the mirror is in a plane of the optical waveguide, and
wherein the mirror is coupled to an end of the optical waveguide on a side surface of the optical waveguide, wherein the end of the optical waveguide is aligned with the second end of the photo-detector wherein the mirror is configured to reflect the optical signal back toward the optical waveguide, wherein the mirror causes the optical signal to move in a reversed direction, thereby increasing an absorption length of the photo-detector, and wherein the optical signal is evanescently coupled between the optical waveguide and the photo-detector.

2. The optical device of claim 1, wherein the mirror is included in the optical waveguide.

3. The optical device of claim 1, wherein the mirror includes an element selected from the group consisting of: a distributed Bragg reflection grating and an etched vertical facet with a reflection coating.

4. The optical device of claim 1, wherein the photo-detector includes periodic rows of electrical contacts along a length of the photo-detector.

5. The optical device of claim 4, wherein the electrical contacts are positioned at locations along the length where the optical signal is substantially in the optical waveguide.

6. The optical device of claim 4, wherein electrical contacts in a given row are electrically connected to each other via a metal layer.

7. The optical device of claim 6, wherein the metal layer is fingered proximate to the electrical contacts.

8. The optical device of claim 1, wherein the optical waveguide includes a taper that expands a width of the optical waveguide prior to the photo-detector.

9. The optical device of claim 1, further comprising:
a substrate;
a buried-oxide layer disposed on the substrate; and
a semiconductor layer disposed on the buried-oxide layer, wherein the optical waveguide is included in the semiconductor layer.

10. The optical device of claim 9, wherein the substrate includes a semiconductor.

11. The optical device of claim 1, wherein the photo-detector includes germanium.

12. A system, comprising:
a processor;
a memory storing a program module that is configured to be executed by the processor; and
an optical device, wherein the optical device includes:
an optical waveguide configured to convey an optical signal having a wavelength;
a photo-detector having a first end and a second end on opposite sides of side surfaces of the photo-detector, wherein a bottom surface of the photo-detector is disposed on and optically coupled to a region of a top surface of the optical waveguide, wherein the photo-detector is configured to convert the optical signal to an electrical signal; and
a mirror after and proximate to the second end of the photo-detector, wherein the mirror is in a plane of the optical waveguide, and
wherein the mirror is coupled to an end of the optical waveguide on a side surface of the optical waveguide, wherein the end of the optical waveguide is aligned with the second end of the photo-detector, wherein the mirror is configured to reflect the optical signal back toward the optical waveguide, wherein the mirror causes the optical signal to move in a reversed direction, thereby increasing an absorption length of the photo-detector, and wherein the optical signal is evanescently coupled between the optical waveguide and the photo-detector.

13. The system of claim 12, wherein the mirror is included in the optical waveguide.

14. The system of claim 12, wherein the photo-detector includes periodic rows of electrical contacts along a length of the photo-detector.

15. The system of claim 14, wherein electrical contacts in a given row are electrically connected to each other via a metal layer.

16. The system of claim 15, wherein the metal layer is fingered proximate to the electrical contacts.

17. The system of claim 14, wherein the electrical contacts are positioned at locations along the length where the optical signal is substantially in the optical waveguide.

18. A method for converting an optical signal into an electrical signal, wherein the method comprises:
   conveying the optical signal in an optical waveguide in a first propagation direction;
   evanescently coupling the optical signal into a photo-detector disposed on a surface of the optical waveguide;
   converting a portion of the optical signal into an electrical signal in the photo-detector;
   reflecting a remainder of the optical signal back toward the optical waveguide in a second propagation direction using a mirror proximate to an end of the photo-detector and in a plane of the optical waveguide, wherein the mirror causes the optical signal to move in a reversed direction, thereby increasing an absorption length of the photo-detector;
   evanescently coupling the remainder of the optical signal into the photo-detector; and
   converting a portion of the remainder of the optical signal into the electrical signal in the photo-detector,
   wherein a bottom surface of the photo-detector is disposed on and optically coupled to a region of a top surface of the optical waveguide, wherein the mirror is coupled to an end of the optical waveguide on a side surface of the optical waveguide, wherein the end of the optical waveguide is aligned with the end of the photo-detector on a side surface of the photo-detector.

* * * * *

UNITED STATES PATENT AND TRADEMARK OFFICE
CERTIFICATE OF CORRECTION

PATENT NO. : 10,119,857 B2
APPLICATION NO. : 13/588248
DATED : November 6, 2018
INVENTOR(S) : Li et al.

Page 1 of 1

It is certified that error appears in the above-identified patent and that said Letters Patent is hereby corrected as shown below:

In the Specification

In Column 4-5, Line 67 (Column 4) and Line 1 (Column 5), delete "700 C)," and insert -- 700° C.), --, therefor.

In Column 5, Line 9, delete "350 C)," and insert -- 350° C.), --, therefor.

Signed and Sealed this
Twenty-ninth Day of October, 2019

Andrei Iancu
*Director of the United States Patent and Trademark Office*